US012422773B2

(12) United States Patent
Fukuma

(10) Patent No.: US 12,422,773 B2
(45) Date of Patent: Sep. 23, 2025

(54) IMAGE FORMING APPARATUS EQUIPPED WITH GUIDE PORTION CAPABLE OF GUIDING INCLINED MANUAL FEED TRAY FROM OPENING TO INTERIOR OF APPARATUS BODY

(71) Applicant: KYOCERA Document Solutions Inc., Osaka (JP)

(72) Inventor: Nobuhiro Fukuma, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 50 days.

(21) Appl. No.: 18/582,922

(22) Filed: Feb. 21, 2024

(65) Prior Publication Data

US 2024/0288817 A1 Aug. 29, 2024

(30) Foreign Application Priority Data

Feb. 27, 2023 (JP) ................................. 2023-028582

(51) Int. Cl.
*G03G 15/00* (2006.01)
*B65H 1/04* (2006.01)

(52) U.S. Cl.
CPC ........... *G03G 15/6514* (2013.01); *B65H 1/04* (2013.01); *B65H 2407/21* (2013.01); *G03G 2215/00383* (2013.01); *G03G 2215/00392* (2013.01); *G03G 2215/00679* (2013.01)

(58) Field of Classification Search
CPC ......... G03G 15/6514; B65H 1/00; B65H 1/04
See application file for complete search history.

(56) References Cited

U.S. PATENT DOCUMENTS 8,523,466 B2 * 9/2013 Mizuguchi ......... G03G 15/6514 400/642
9,039,005 B2 * 5/2015 Minoshima .......... B65H 3/0684 271/9.08
9,061,853 B2 * 6/2015 Okabe .................... B65H 3/446
9,284,137 B2 * 3/2016 Sato ......................... B65H 1/04
(Continued)

FOREIGN PATENT DOCUMENTS

JP H0672595 A 3/1994
JP H11194567 A 7/1999
(Continued)

*Primary Examiner* — Patrick Cicchino
(74) *Attorney, Agent, or Firm* — IP Business Solutions, LLC.

(57) ABSTRACT

An image forming apparatus includes: a manual feed tray that is provided at an opening in a sidewall of an apparatus body of the image forming apparatus and opens or closes the opening by an opening/closing operation; a guide portion that supports movement of the manual feed tray based on the opening/closing operation between a first position where the manual feed tray is upright along the sidewall to close the opening and a second position where the manual feed tray inclines toward outside of the apparatus body to open the opening, and guides the manual feed tray in the second position from the opening to within the apparatus body to retract the manual feed tray within the apparatus body; a sheet feed mechanism that feeds a sheet on the retracted manual feed tray; and an image forming device that forms an image on the sheet fed from the manual feed.

1 Claim, 8 Drawing Sheets

(56) References Cited

U.S. PATENT DOCUMENTS

| | | | | |
|---|---|---|---|---|
| 2010/0172678 | A1* | 7/2010 | Kim | G03G 15/6502 399/393 |
| 2014/0016980 | A1* | 1/2014 | Minoshima | G03G 15/6511 271/10.01 |

FOREIGN PATENT DOCUMENTS

| | | | |
|---|---|---|---|
| JP | 2008203863 | A | 9/2008 |
| JP | 2017165532 | A | 9/2017 |
| JP | 2021031187 | A | 3/2021 |

* cited by examiner

IMAGE FORMING APPARATUS EQUIPPED WITH GUIDE PORTION CAPABLE OF GUIDING INCLINED MANUAL FEED TRAY FROM OPENING TO INTERIOR OF APPARATUS BODY

INCORPORATION BY REFERENCE

This application claims priority to Japanese Patent Application No. 2023-028582 filed on 27 Feb. 2023, the entire contents of which are incorporated by reference herein.

BACKGROUND

The present disclosure relates to image forming apparatuses that pull and feed a sheet from a manual feed tray.

An image forming apparatus is an apparatus that forms an image on a recording paper sheet and includes a sheet feed cassette or a manual feed tray which feed the recording paper sheet. The manual feed tray is provided at an opening in a sidewall of an apparatus body of the image forming apparatus and opened or closed with respect to the apparatus body by an opening/closing operation. A recording paper sheet is placed on the manual feed tray opened to the outside of the apparatus body and pulled and fed from the manual feed tray into the apparatus body.

A general manual feed mechanism is designed so that a table is supported on a body of a copier to be openable and closable with respect to the copier body, fitted in a containing portion formed in a side surface of the copier body when closed, and opened to the outside of the copier body to allow a transfer sheet to be placed on the opened table.

A first general image forming apparatus includes a sheet conveyance path along which a sheet is conveyed to an image forming device, an openable and closable cover capable of opening the sheet conveyance path to the outside, and a manual feed tray from which the sheet is fed to the sheet conveyance path, wherein the manual feed tray is integrally provided with the cover.

In a second general image forming apparatus, a sheet feed cassette is provided below a printing unit detachably from the apparatus and an insertion opening through which a manual feed sheet can be inserted is provided above the sheet feed cassette.

SUMMARY

A technique improved over the aforementioned techniques is proposed as one aspect of the present disclosure.

An image forming apparatus according to an aspect of the present disclosure includes a manual feed tray, a guide portion, a sheet feed mechanism, and an image forming device. The manual feed tray is provided at an opening in a sidewall of an apparatus body of the image forming apparatus and opened or closed with respect to the apparatus body by an opening/closing operation to take a position to open the opening or a position to close the opening. The guide portion supports movement of the manual feed tray based on the opening/closing operation between a first position where the manual feed tray is upright along the sidewall to close the opening in the sidewall and a second position where the manual feed tray inclines toward outside of the apparatus body to open the opening in the sidewall, and allows the manual feed tray inclined in the second position to move from the opening to an interior of the apparatus body to guide movement of the manual feed tray to a retracted position where the manual feed tray is retracted within the apparatus body. The sheet feed mechanism feeds a sheet placed on the manual feed tray being in the retracted position. The image forming device forms an image on the sheet fed from the manual feed tray by the sheet feed mechanism.

DETAILED DESCRIPTION

Figure 1A:
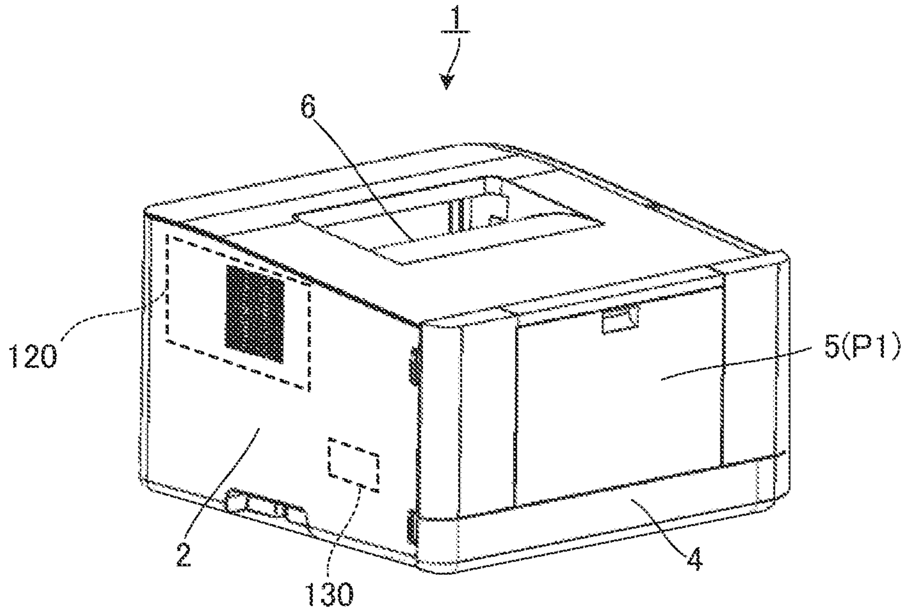
FIGS. 1A and 1B are perspective views showing the appearance of an image forming apparatus according to an embodiment of the present disclosure.
Figure 1B:
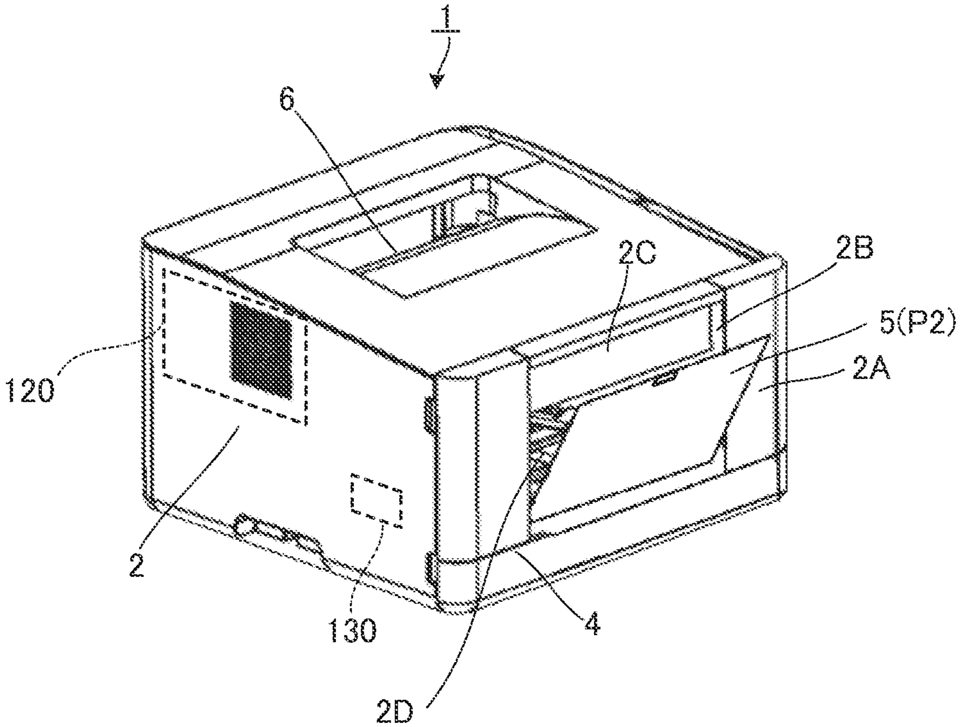

Hereinafter, a description will be given of an embodiment of the present disclosure with reference to the drawings. FIGS. 1A and 1B are perspective views showing the appearance of an image forming apparatus 1 according to an embodiment of the present disclosure, FIG. 1A shows a state where a manual feed tray 5 is closed, and FIG. 1B shows a state where the manual feed tray 5 is opened. As shown in FIGS. 1A and 1B, the image forming apparatus 1 is, for example, a printer, an apparatus body 2 of the image forming apparatus 1 is provided with a sheet feed cassette 4, the manual feed tray 5, a sheet output tray 6, and so on, and the interior of the apparatus body 2 is provided with an image forming device 120, inclusive of a fixing device, and so on.

The image forming device 120 forms an image represented by image data on a recording paper sheet fed from the sheet feed cassette 4 or the manual feed tray 5, for example, by an electrophotographic process using a toner. The recording paper sheet with the image formed thereon is subjected to fixation processing by the fixing device and then ejected to the sheet output tray 6.

Figure 2A:
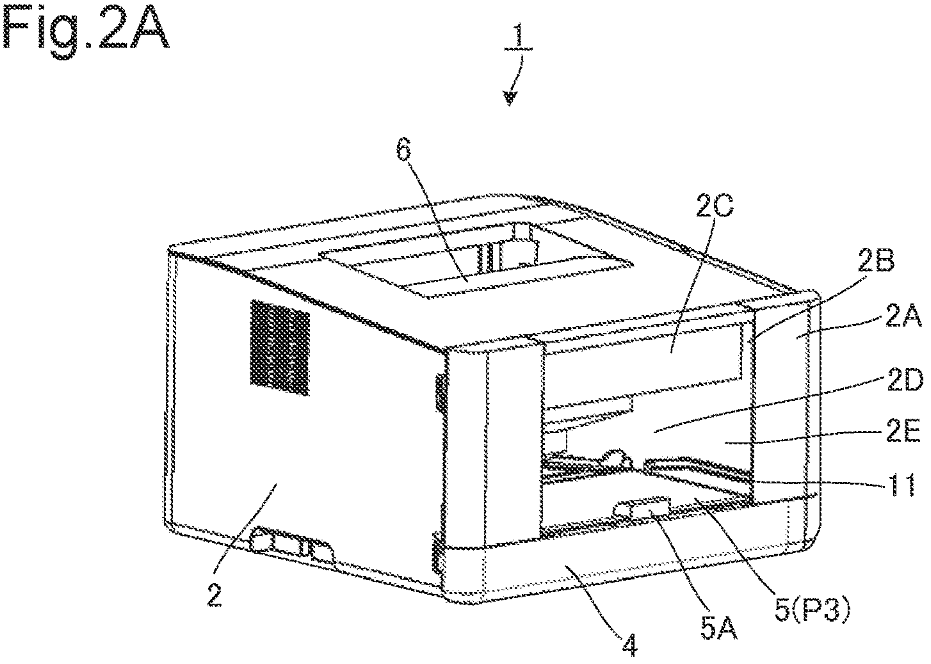
FIGS. 2A and 2B are perspective views showing a state where a manual feed tray of the image forming apparatus is opened and retracted within an apparatus body.
Figure 2B:
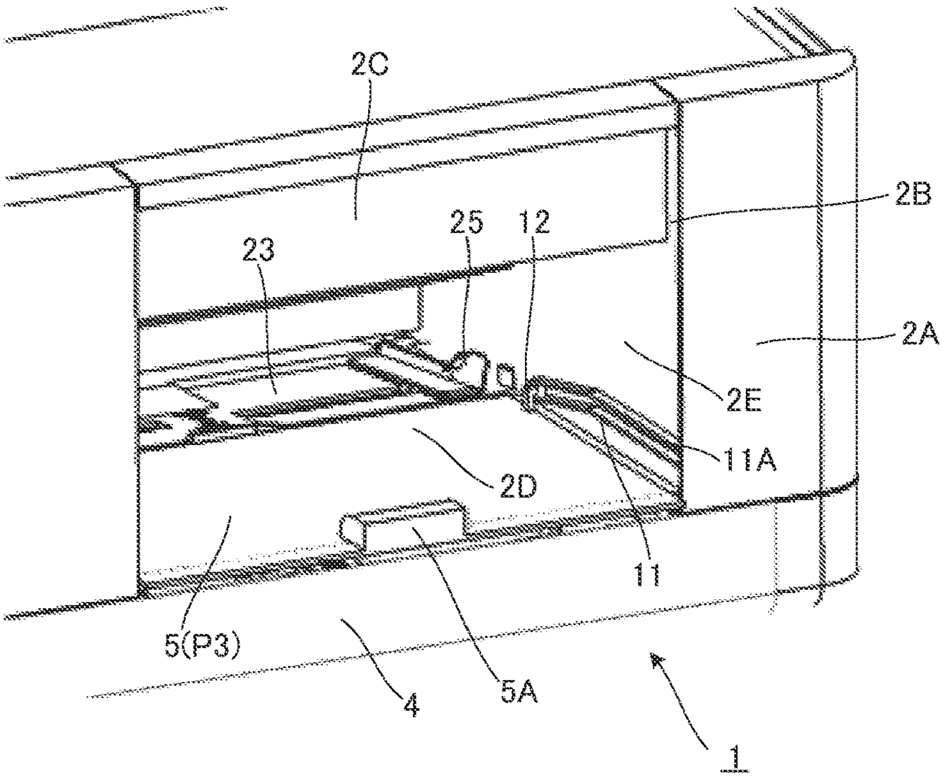

FIG. 2A is a perspective view showing a state where the manual feed tray 5 of the image forming apparatus 1 is opened and retracted within the apparatus body 2. FIG. 2B is a perspective view showing in magnification the state where the manual feed tray 5 is opened and retracted within the apparatus body 2.

As shown in FIGS. 1A, 1B, 2A, and 2B, in the image forming apparatus 1, the manual feed tray 5 is provided to fit a recess 2B in a sidewall 2A of the apparatus body 2 so as to be openable and closable with respect to the recess 2B. An upper portion of the recess 2B in the sidewall 2A forms a wall portion 2C and a lower portion of the recess 2B in the sidewall 2A forms an opening 2D leading to the interior of the apparatus body 2. In other words, the manual feed tray 5 is provided at the opening 2D in the sidewall 2A of the apparatus body 2 and opened or closed with respect to the apparatus body 2 by an opening/closing operation to take a position to open the opening 2D or a position to close the opening 2D.

The manual feed tray 5 has a flat plate-like shape. When an opening/closing operation is made on the manual feed tray 5, the manual feed tray 5 is moved to a first position P1 where the manual feed tray 5 is held upright to close the recess 2B and the opening 2D as shown in FIG. 1A or moved to a second position P2 where the manual feed tray 5 is inclined toward the outside from the apparatus body 2 to open the recess 2B and the opening 2D as shown in FIG. 1B.

A pair of inside walls 2E of the apparatus body 2 opposed to each other are provided with respective guide members 11. These guide members 11 extend approximately horizontally from the opening 2D toward the interior of the apparatus body 2 and then bend and incline obliquely downward in the interior of the apparatus body 2. The guide members 11 include respective grooves 11A formed to face each other.

The guide members 11 support, through lateral extension lugs 12 provided on the manual feed tray 5, the movement of the manual feed tray 5 between the first position P1 and the second position P2 based on the above-described opening/closing operation on the manual feed tray 5.

Furthermore, the guide members 11 enable, through the lateral extension lugs 12, the movement of the manual feed tray 5 inclined in the second position P2 from the opening 2D to the interior of the apparatus body 2 and guide, through the lateral extension lugs 12, the movement of the manual feed tray 5 to a retracted position P3 where the manual feed tray 5 is retracted within the apparatus body 2 as shown in FIGS. 2A and 2B.

Figure 3:
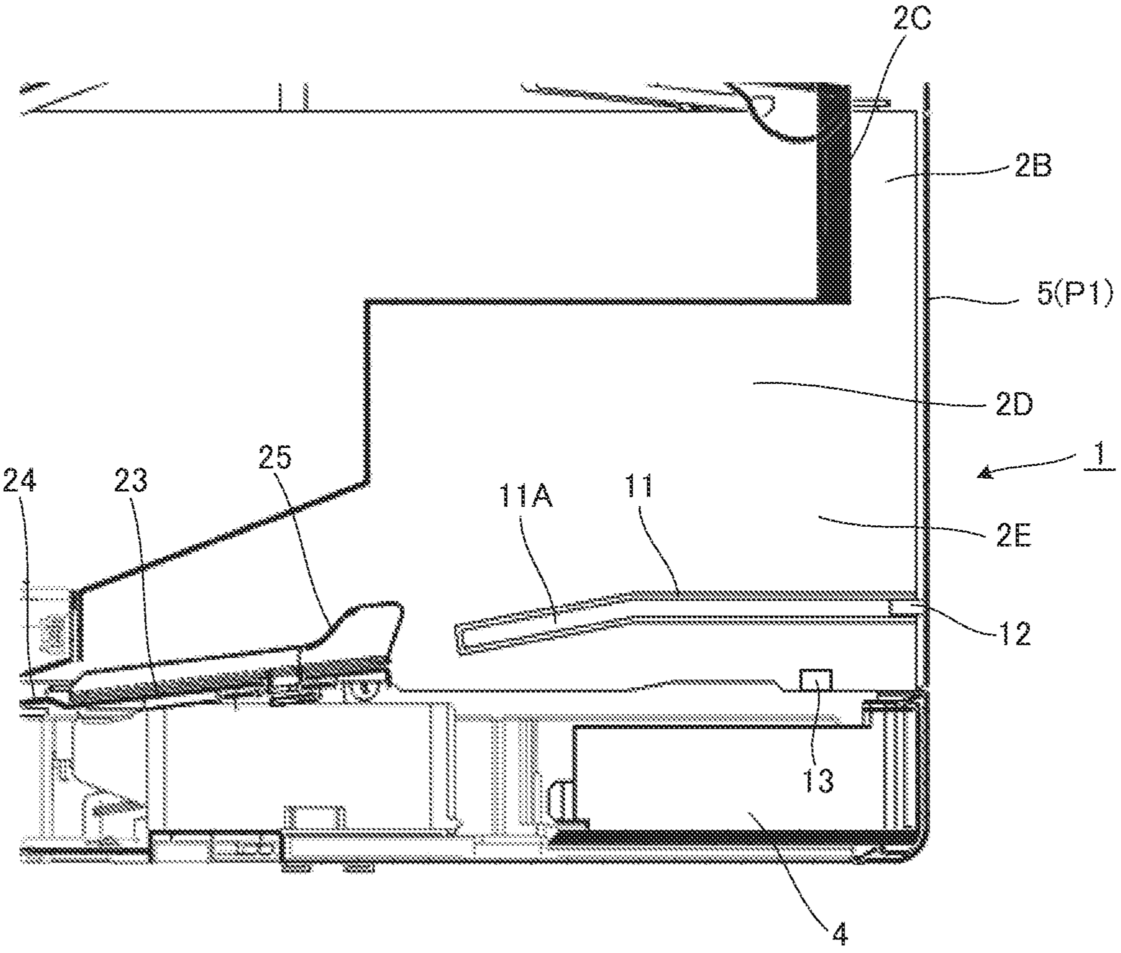
FIG. 3 is a vertical cross-sectional view showing the image forming apparatus and shows a state where the manual feed tray is held upright.
Figure 4:
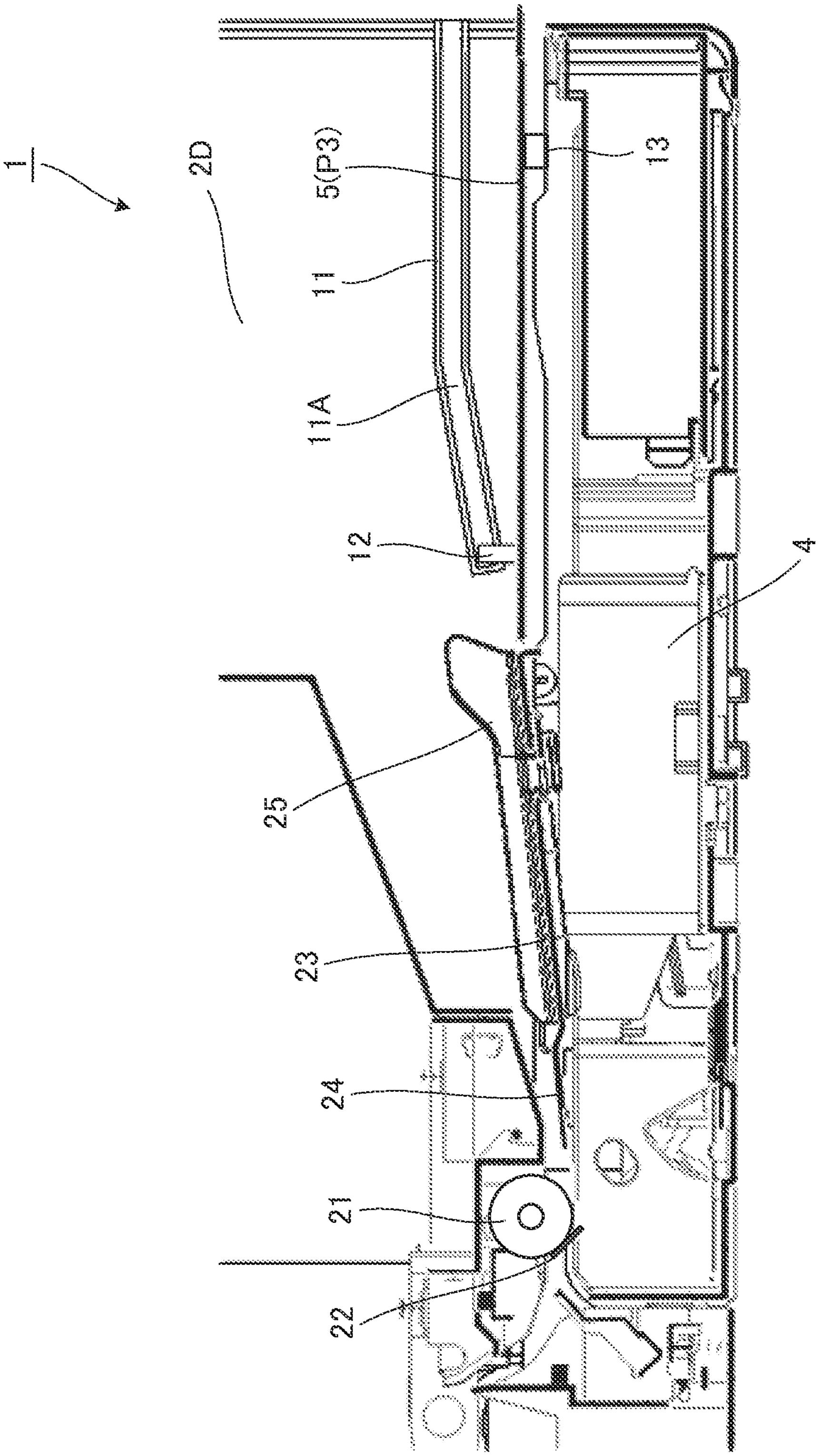
FIG. 4 is a vertical cross-sectional view showing the image forming apparatus and shows a state where the manual feed tray is retracted and laid down within the apparatus body.

FIGS. 3 and 4 are vertical cross-sectional views showing the image forming apparatus 1, FIG. 3 shows a state where the manual feed tray 5 is held upright, and FIG. 4 shows a state where the manual feed tray 5 is retracted and laid down within the apparatus body 2.

The manual feed tray 5 is provided at both the lateral ends with respective lateral extension lugs 12 described previously. When, as shown in FIG. 3, the manual feed tray 5 fits together with the sidewall 2A of the apparatus body 2 to form an integral exterior wall with it and is upright, the lateral extension lugs 12 are located at low height positions on the lateral ends of the upright manual feed tray 5. The lateral extension lugs 12 are provided at their distal ends with respective projections 14 (see FIG. 5) projecting as portions of the lateral extension lugs 12 laterally to the manual feed tray 5. The lateral extension lugs 12 are provided at both sides of the manual feed tray 5 in a widthwise direction of the manual feed tray 5 orthogonal to the direction of movement of the manual feed tray 5.

Figure 5:
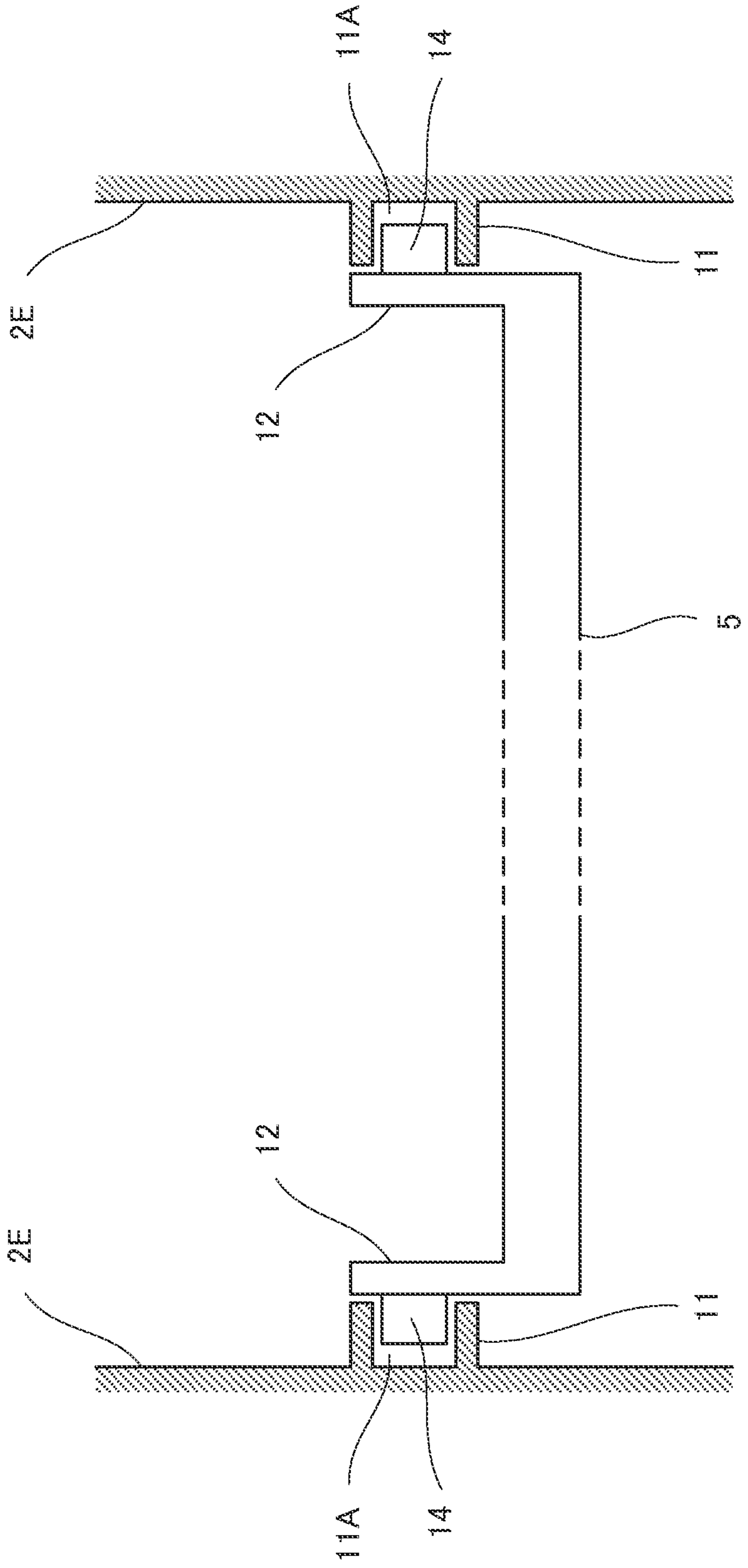
FIG. 5 is a vertical cross-sectional view showing guide members, lateral extension lugs, and projections of the image forming apparatus in magnification.

FIG. 5 is a vertical cross-sectional view showing the guide members 11, the respective associated lateral extension lugs 12, and the respective associated projections 14 in magnification. As shown in FIG. 5, the manual feed tray 5 are provided at both the lateral ends with the respective lateral extension lugs 12 and the lateral extension lugs 12 are provided at their distal ends with the respective projections 14 projecting laterally. Each of the projections 14 is fitted movably into an associated one of the grooves 11A facing each other in the opposed guide members 11 and, thus, the manual feed tray 5 is supported at both the lateral ends by the guide members 11.

Since, as shown in FIG. 5, each of the projections 14 at both the lateral ends of the manual feed tray 5 is fitted movably into an associated one of the grooves 11A in the guide members 11, the manual feed tray 5 pivotally moves with the projections 14 as the axis of rotation to incline toward the outside of the apparatus body 2. With the projections 14 supported by the respective grooves 11A in the guide members 11 in this manner, the manual feed tray 5 is movable between the first position P1 and the second position P2. In other words, in a manner that the manual feed tray 5 pivotally opens toward the outside of the apparatus body 2 or fits together with the apparatus body 2 to close with respect to the apparatus body 2, the manual feed tray 5 is movable between the first position P1 and the second position P2. By making this movement, the manual feed tray 3 acts to open and close the opening 2D in the sidewall 2A of the apparatus body 2. By a user's opening/closing operation on the manual feed tray 5, the manual feed tray 5 takes a position to open the opening 2D or a position to close the opening 2D.

Furthermore, as shown in FIG. 4, the projections 14 at both the lateral ends of the manual feed tray 5 being inclined in the second position P2 are guided along the grooves 11A in the guide members 11 and, thus, the manual feed tray 5 in the second position P2 moves from the opening 2D toward the interior of the apparatus body 2. In other words, the manual feed tray 5 is guided to move to the retracted position P3 by the pair of projections 14 and the pair of guide members 11.

Support members 13 are provided below the respective guide members 11 on the inside walls 2E. In a state where, as shown in FIG. 4, the manual feed tray 5 is retracted and laid down within the apparatus body 2, the bottom of the manual feed tray 5 abuts on the respective support members 13 on the inside walls 2E.

Figure 6A:
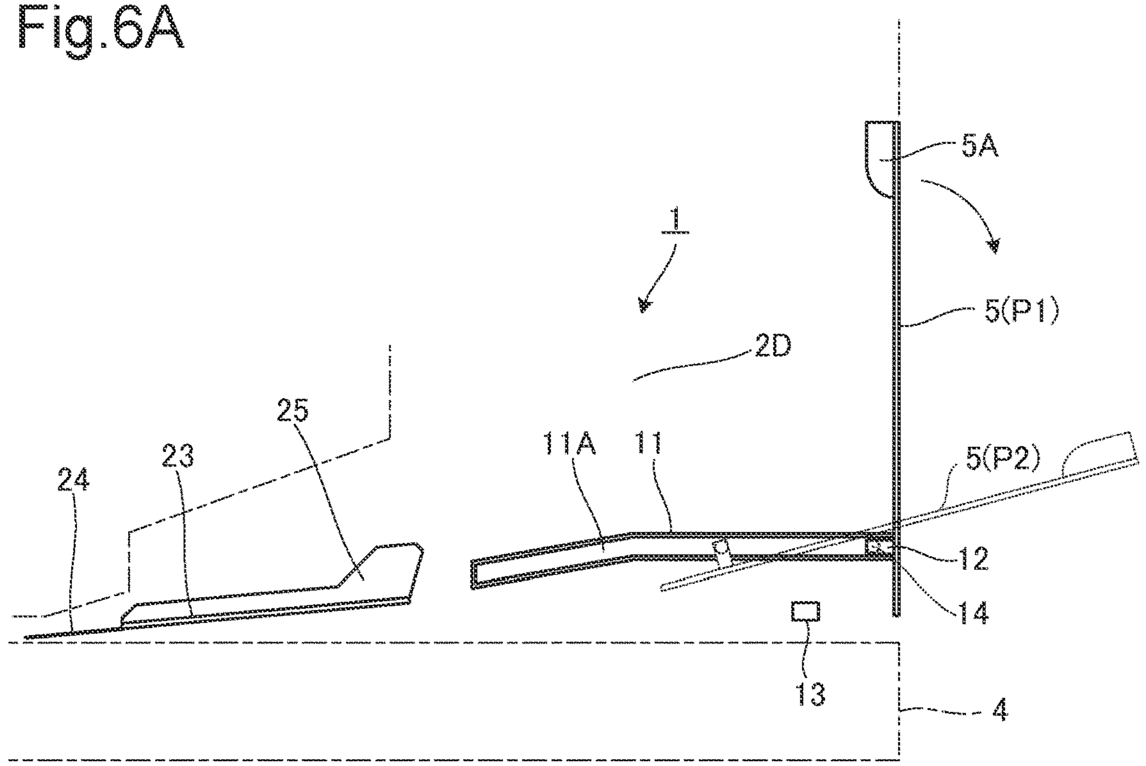
FIGS. 6A and 6B are views showing an operating procedure of the manual feed tray in the image forming apparatus.

Meanwhile, in a state where the manual feed tray 5 is in an upright position as shown by the solid line in FIG. 6A, the projections 14 of the manual feed tray 5 are located in the grooves 11A of the guide members 11 at the front (the right end in FIG. 6A) of the apparatus body 2. In this state, the projections 14 are supported by the respective associated grooves 11A of the guide members 11 and thus stably held at the first position P1. In opening the manual feed tray 5 to the outside of the apparatus body 2 by a user's operation, the user pivotally moves the manual feed tray 5 clockwise in FIG. 6A about the axes of the projections 14. In doing so, while pivotally moving the manual feed tray 5 as just described, the user pushes the manual feed tray 5 into the apparatus body 2 to move it toward the interior of the apparatus body 2. The projections 14 of the manual feed tray 5 are guided by and slide in the grooves 11A of the guide members 11. While the manual feed tray 5 goes into the apparatus body 2 in this manner, the manual feed tray 5 is guided into the apparatus body 2 in an inclined position where the manual feed tray 5 does not lie down to a position parallel to the sheet feed cassette 4 and the mounting floor surface (a position orthogonal to the sidewall 2A). Therefore, the space around (outside) the image forming apparatus 1 necessary for the user to make an operation for retracting the manual feed tray 5 into the apparatus body 2 is sufficient smaller than the space necessary in the case where a recording paper sheet for manual feeding is placed on the manual feed tray 5 fully reclined to the position parallel to the sheet feed cassette 4 and the mounting floor surface (the position orthogonal to the sidewall 2A).

Figure 6B:
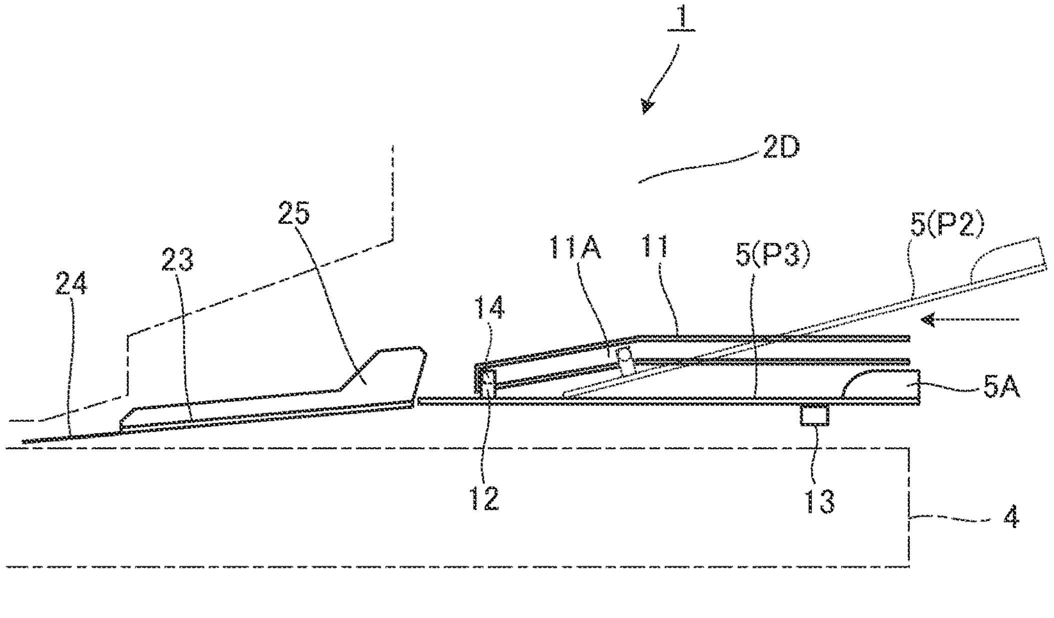

As shown by the broken line in FIG. 6B, when the manual feed tray 5 goes further into the apparatus body 2 under the guidance of the guide members 11 and the projections 14 at both the lateral ends of the manual feed tray 5 reach respective obliquely downwardly inclined portions of the grooves 11A of the guide members 11, the projections 14 slide down the obliquely downwardly inclined portions of the grooves 11A under the self-weight of the manual feed tray 5 and then quickly reach the innermost ends (the left ends in FIG. 6B) of the grooves 11A of the guide members 11 located medially in the apparatus body 2. At this time, as shown by the solid line in FIG. 6B, the manual feed tray 5 falls horizontally, the bottom of the manual feed tray 5 abuts against the support members 13, and the manual feed tray 5 is supported by the sheet feed cassette 4. The manual feed tray 5 is stably held in the retracted position P3 by the projections 14 having moved to the innermost ends of the grooves 11A of the guide members 11 and the support members 13.

While the manual feed tray 5 is in the retracted position P3, the manual feed tray 5 is positioned above and cover the sheet feed cassette 4. Therefore, although the opening 2D of the apparatus body 2 is open for manual sheet feeding, the sheet feed cassette 4 is protected from entry of dust and the like from the outside of the apparatus body 2.

In returning the manual feed tray 5 to the first position P1 to close the opening 2D, the user operates the manual feed tray 5 by a reverse procedure to the procedure described above with reference to FIGS. 6A and 6B. Specifically, the user pulls up a handle portion 5A of the manual feed tray 5 being in the retracted position P3 to lift the manual feed tray 5 from the sheet feed cassette 4 and pulls the manual feed tray 5 out of the apparatus body 2. The projections 14 of the manual feed tray 5 are guided by and slide in the grooves 11A of the guide members 11 toward the outside of the apparatus body 2. When the projections 14 of the manual feed tray 5 are moved to the outermost ends (right ends in FIGS. 6A and 6B) of the grooves 11A of the guide members 11 located at the front of the apparatus body 2 and abut against and engage at the outermost ends, the user pivotally moves the manual feed tray 5 to its upright position, i.e., moves the manual feed tray 5 to the first position P1, to close the opening 2D with the manual feed tray 5.

As shown in FIG. 4, the apparatus body 2 is provided internally with a sheet feed roller 21 and a separating pad 22. The sheet feed roller 21 is an example of the sheet feed mechanism, is disposed above an innermost end of the sheet feed cassette 6 located in the back of the interior of the apparatus body 2, pulls out a recording paper sheet (an example of the sheet) P contained in the sheet feed cassette 4 as will be described hereinafter, and feeds (conveys) the recording paper sheet P. In the interior of the apparatus body 2, the manual feed tray 5 in the retracted position P3, a sub-tray 23, and the sheet feed roller 21 are arranged in order from upstream to downstream in a direction of pull-out of the recording paper sheet P. When a recording paper sheet P is placed on the manual feed tray 5 being in the retracted position P3, the sub-tray 23 receives a leading portion of the recording paper sheet P (a portion of the recording paper sheet P located deeper in the interior of the apparatus body 2 than the other portion thereof) placed on the manual feed tray 5. In a state where the opening 2D is open and not closed, the manual feed tray 5 and the sub-tray 23 are disposed to connect to the opening 2D in the apparatus body 2. Thus, the recording paper sheet P can be easily placed through the opening 2D on the manual feed tray 5 and the sub-tray 23 and treated as an object to be fed by the sheet feed roller 21.

A film 24 made of a flexible synthetic resin (for example, polyethylene terephthalate) is provided at the distal end of the sub-tray 23. The film 24 is extended from the distal end of the sub-tray 23 to short of the sheet feed roller 21 and the separating pad 22 and leads the leading end of a recording paper sheet P on the manual feed tray 5 and the sub-tray 23 to the sheet feed roller 21 and the separating pad 22.

In other words, the sheet feed roller 21 is provided at a location where it is capable of feeding a sheet placed on the manual feed tray 5 in the retracted position P3 and also capable of feeding, when no recording paper sheet P is placed on the manual feed tray 5, a recording paper sheet P contained in the sheet feed cassette 4.

The sub-tray 23 is further provided with a pair of lateral cursors 25. The lateral cursors 25 face each other in the widthwise direction of the recording paper sheet P, are movable in a direction toward and away from each other, and abut on both the lateral edges of the recording paper sheet P to position both the lateral edges thereof. The mechanism for moving the lateral cursors 25 in the direction toward and away from each other is a known mechanism (see, for example, JP-A-2021-031187).

Figure 7A:
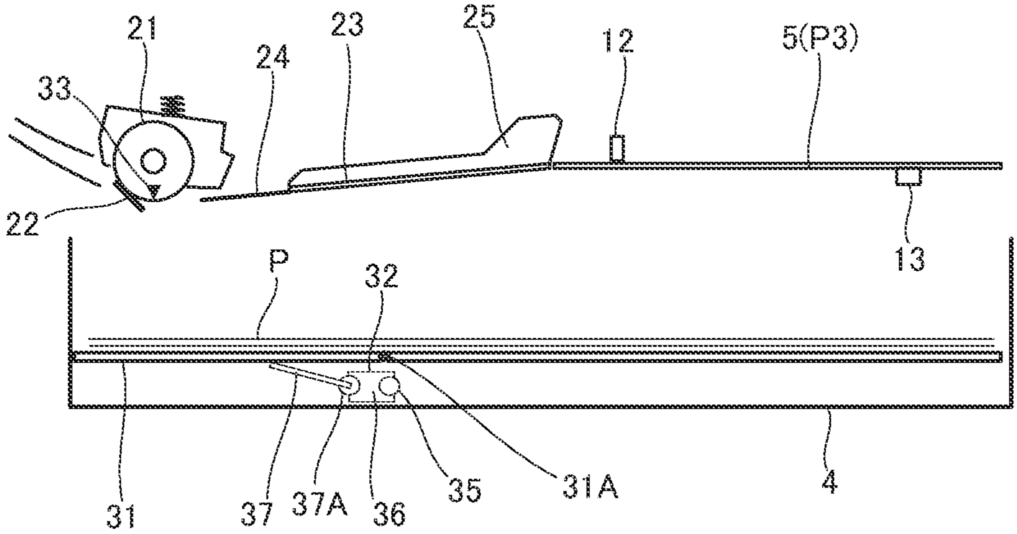
FIGS. 7A and 7B are views showing an operation for feeding a recording paper sheet from a sheet feed cassette.
Figure 7B:
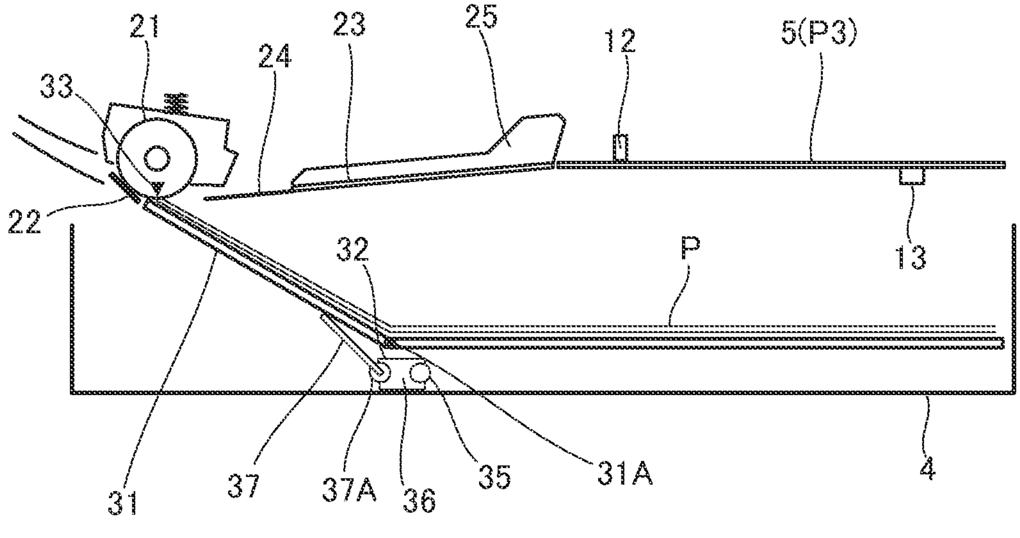

Next, a description will be given of the operation of feeding a recording paper sheet P from the sheet feed cassette 4 to the image forming device 120 and the operation of feeding a recording paper sheet P from the manual feed tray 5 to the image forming device 120 with reference to FIGS. 7A, 7B, 8A, and 8B. FIGS. 7A and 7B are side views schematically showing the surroundings of the manual feed tray 5 and the sheet feed cassette 4, FIG. 7A shows a state where a lifting plate 31 of the sheet feed cassette 4 has descended, and FIG. 7B shows a state where the lifting plate 31 has ascended.

As shown in FIG. 7A, the sheet feed cassette 4 is provided with: the lifting plate 31 on which recording paper sheets P are to be loaded; the sheet feed roller 21 that pulls out a recording paper sheet P from the lifting plate 31; the separating pad 22 pressed against a lower portion of the peripheral surface of the sheet feed roller 21; an elevating device 32 that elevates or lowers the distal end of the lifting plate 31; an upper limit position sensor 33 that detects an upper limit position of an uppermost one of recording paper sheets P loaded on the lifting plate 31; and so on. The control of the operations that will be described below are performed by a control device 130 included in the image forming apparatus 1.

The control device 130 is made up by including a processor, a RAM (random access memory), a ROM (read only memory), and a dedicated hardware circuit. The processor is, for example, a CPU (central processing unit), an ASIC (application specific integrated circuit) or an MPU (micro processing unit).

The upper limit sensor 33 is a combination of a detection mechanism that detects the upper limit position of an uppermost one of recording paper sheets P on the sheet feed cassette 4 or the manual feed tray 5 and an optical sensor (see, for example, JP-A-2017-165532) or a limit switch that, upon contact with an uppermost recording paper sheet P, detects the upper limit position of the recording paper sheet P.

The base end of the lifting plate 31 is supported pivotally about a shaft 31A and the distal end of the lifting plate 31 is ascended and descended by the elevating device 32. The elevating device 32 includes an elevating motor 35, a gear unit 36, and an elevating arm 37. When the elevating motor 35 is driven into rotation, this rotation is transmitted via the gear unit 36 to the elevating arm 37 and the elevating arm 37 is thus pivotally moved about a shaft 37A.

Referring to FIG. 7A, when the elevating motor 35 of the elevating device 32 is driven into rotation in one direction, the elevating arm 37 is pivotally moved counterclockwise in FIG. 7A about the shaft 37A, the lifting plate 31 pivotally moves counterclockwise in FIG. 7A under its own weight while following the movement of the distal end of the elevating arm 37, the distal end of the lifting plate 31 descends, the lifting plate 31 moves away from the sheet feed roller 21, and the elevating motor 35 of the elevating device 32 is then stopped. In this state, the user loads a plurality of recording paper sheets P on the lifting plate 31.

On the other hand, referring to FIG. 7B, when the elevating motor 35 of the elevating device 32 is driven into rotation clockwise in FIG. 7A, the elevating arm 37 is pivotally moved clockwise in FIG. 7B about the shaft 37A, the lifting plate 31 is pushed up by the distal end of the elevating arm 37 and pivotally moves clockwise in FIG. 7B about the shaft 31A, and the distal end of the lifting plate 31 ascends. Then, when the upper limit position of an uppermost one of recording paper sheets P on the lifting plate 31 is detected by the upper limit position sensor 33, the elevating motor 35 of the elevating device 32 is stopped and the leading end of the uppermost recording paper sheet P on the lifting plate 31 comes into contact with the sheet feed roller 21. When, in this state, the sheet feed roller 21 is rotated, the recording paper sheets P are pulled up from the lifting plate 31, separated sheet by sheet by the separating pad 22, and fed sheet by sheet by the sheet feed roller 21. At this time, the height of the sheet feed roller 21 is at a reference position for sheet feeding from the sheet feed cassette 4.

Figure 8A:
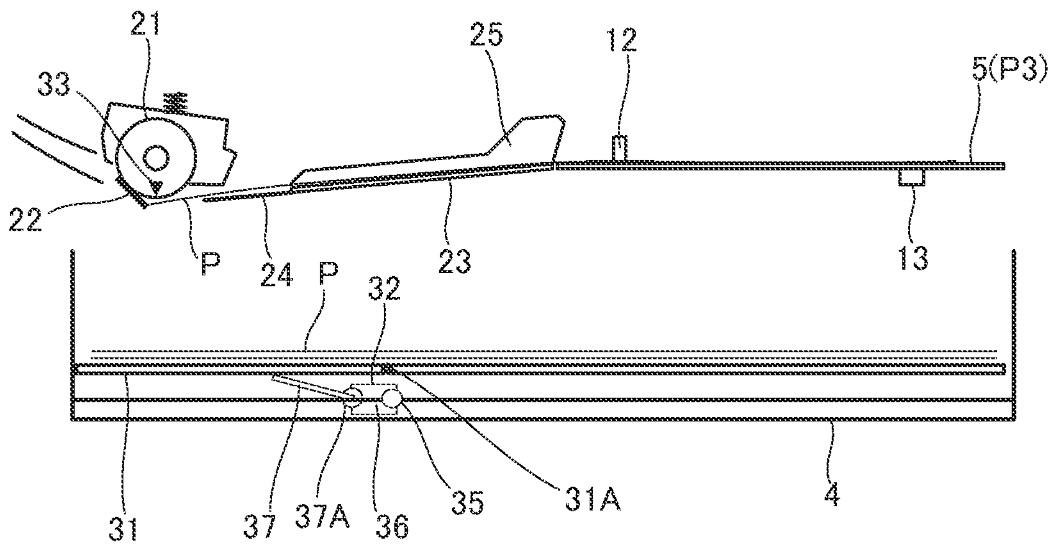
FIGS. 8A and 8B are views showing an operation for feeding a recording paper sheet from the manual feed tray.

Referring to FIG. 8A, in feeding a recording paper sheet P from the manual feed tray 5 in the retracted position P3, a single or plurality of recording paper sheets P are placed on the manual feed tray 5 and the sub-tray 23 in a state where the lifting plate 31 is descended, and the leading ends of the recording paper sheets P are led to the sheet feed roller 21 and the separating pad 22 by the film 24 and then abut against the separating pad 22. In this case, to fit the feeding of the recording paper sheet P from the manual feed tray 5, the sheet feed roller 21 is ascended to a predetermined manual feed position higher than the reference position for sheet feeding from the sheet feed cassette 4. To do this, the image forming apparatus 1 includes a mechanism that moves the sheet feed roller 21 up and down between the reference position and the manual feed position.

Figure 8B:
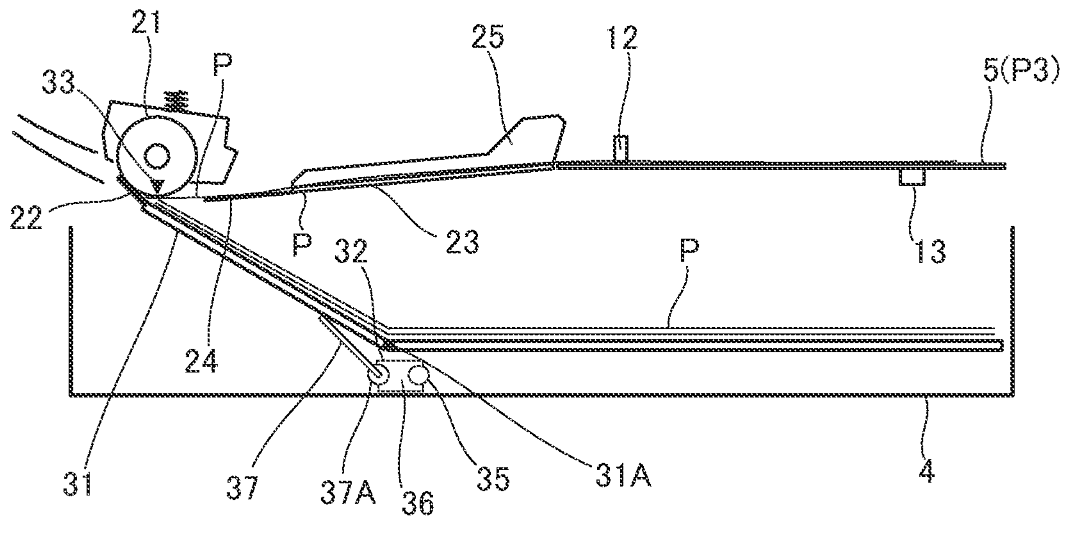

Then, referring to FIG. 8B, when the lifting plate 31 is ascended and pushes up, through the recording paper sheets P on the lifting plate 31, the leading ends of the recording paper sheets P placed on the manual feed tray 5 and the upper limit position of the uppermost recording paper sheet P on the manual feed tray 5 is detected by the upper limit position sensor 33, the elevating motor 35 of the elevating device 32 is stopped and the leading end of the uppermost recording paper sheet P on the manual feed tray 5 comes into contact with the sheet feed roller 21. When, in this state, the sheet feed roller 21 is rotated, the recording paper sheets P are pulled out of the manual feed tray 5, separated sheet by sheet by the separating pad 22, and fed sheet by sheet by the sheet feed roller 21. In other words, the recording paper sheets P are placed on the manual feed tray 5 in the retracted position P3 so that the leading ends of the recording paper sheets P can reach the position where they come into contact with the sheet feed roller 21. Furthermore, when the recording paper sheets P on the manual feed tray 5 are in this state, the recording paper sheets P are located higher than those contained in the sheet feed cassette 4 and moved up by the lifting plate 31. Thus, the recording paper sheets P contained in the sheet feed cassette 4 are interrupted by the recording paper sheets P on the manual feed tray 5 and do not come into contact with the sheet feed roller 21 and the recording paper sheets P on the manual feed tray 5 are fed by the sheet feed roller 21 in priority to the recording paper sheets P contained in the sheet feed cassette 4.

Since, in the general manual feed mechanism described previously, the table is opened to the outside of the copier body and a transfer sheet is placed on the opened table, a space for accommodating the opened table is needed outside the copier body in printing by manual feeding. Likewise, since, in the first general image forming apparatus described previously, the cover provided integrally with the manual feed tray is opened, a space for accommodating the opened cover is needed outside the image forming apparatus in printing by manual feeding. Therefore, in installing the image forming apparatus and printing by manual feeding, a wide place including the above-described space is needed around the image forming apparatus.

Since the second general image forming apparatus described previously is provided with an insertion opening through which a manual feed sheet is to be inserted into the apparatus, there is no need for the space for accommodating the opened table or cover. However, the work for inserting a manual feed sheet is more cumbersome than simply placing a sheet on the opened tray and therefore user-unfriendly.

Unlike the above general techniques, the image forming apparatus 1 according to this embodiment is designed so that, by the opening/closing operation on the manual feed tray 5, the manual feed tray 5 is movable from the first position P1 where the manual feed tray 5 is held upright to close the recess 2B and the opening 2D, through the second position P2, to the retracted position P3 where the manual feed tray 5 is retracted through the opening 2D into the apparatus body 2 and laid down to open the recess 2B and the opening 2D. Therefore, by minimizing the space around the image forming apparatus 1 necessary for opening and closing the manual feed tray 5, the space around the image forming apparatus 1 necessary for installing the apparatus and printing by manual feeding can be reduced.

Furthermore, since the image forming apparatus 1 has a structure in which the manual feed tray 5 is retracted through the opening 2D into the apparatus body 2, recording paper sheets P can be easily placed through the opening 2D of the apparatus body 2 onto the manual feed tray 5, which simplifies the work for placing recording paper sheets P for manual feeding.

In addition, the image forming apparatus 1 is designed so that the sub-tray 23 is provided between the sheet feed roller 21 and the manual feed tray 5 in the retracted position P3 and the leading ends of recording paper sheets P, with leading portions thereof placed on the sub-tray 23, can be allowed to reach a point of contact with the sheet feed roller 21, there is no need for a separate conveyance roller for conveying the recording paper sheets P to the sheet feed roller 21 when the recording paper sheets P are placed on the manual feed tray 5. Thus, the number of components of the image forming apparatus 1 can be reduced.

Furthermore, when retracted within the apparatus body 2, the manual feed tray 5 is located above the sheet feed cassette 4 and cover the sheet feed cassette 4 to function as a cover for protecting the sheet feed cassette 4 from entry of dust and the like. On the other hand, when closing the recess 2B and the opening 2D in the sidewall 2A of the apparatus body 2, the manual feed tray 5 functions as part of the apparatus body 2 to form a portion of the exterior (a portion of the front sidewall), the number of components of the image forming apparatus 1 can be reduced also in this respect.

Although in the above embodiment a printer is taken as an embodiment of the image forming apparatus according to the present disclosure, this is illustrative only and the image forming apparatus according to the present disclosure may be a multifunction peripheral, a copier, a facsimile machine or others.

The structure of the above embodiment described with reference to FIGS. 1A to 8B is merely illustrative of the present disclosure and is not intended to limit the present disclosure to the structure.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:

a manual feed tray that is provided at an opening in a sidewall of an apparatus body of the image forming apparatus and opened or closed with respect to the apparatus body by an opening/closing operation to take a position to open the opening or a position to close the opening;

a guide portion that supports movement of the manual feed tray based on the opening/closing operation between a first position where the manual feed tray is upright along the sidewall to close the opening in the sidewall and a second position where the manual feed tray inclines toward outside of the apparatus body to open the opening in the sidewall, and allows the manual feed tray inclined in the second position to move from the opening to an interior of the apparatus body to guide movement of the manual feed tray to a retracted position where the manual feed tray is retracted within the apparatus body;

a sheet feed mechanism that feeds a sheet placed on the manual feed tray being in the retracted position; and an image forming device that forms an image on the sheet fed from the manual feed tray by the sheet feed mechanism, wherein the sheet feed mechanism comprises:

a sub-tray which is provided at a location leading to the manual feed tray guided to the retracted position and deeper in an interior of the apparatus body than the manual feed tray and on which a leading portion of the sheet placed on the manual feed tray, the leading portion located deeper in the interior of the apparatus body than the other portion of the sheet, is to be placed; and a sheet feed roller that comes into contact with a leading end of the sheet placed on the manual feed tray and the sub-tray and feeds the sheet from the manual feed tray and the sub-tray, wherein the sub-tray comprises a pair of lateral cursors that position both lateral edges of the sheet.

* * * * *